US012725626B2

(12) United States Patent
Kotulla et al.

(10) Patent No.: US 12,725,626 B2
(45) **Date of Patent: *Sep. 1, 2026**

(54) APPARATUS FOR OUTPUTTING AN AUDIO SIGNAL IN A VEHICLE CABIN

(71) Applicant: ASK INDUSTRIES GMBH, Niederwinkling (DE)

(72) Inventors: Daniel Kotulla, Mitterfels (DE); James Rex, Offenberg/Neuhause (DE)

(73) Assignee: Ask Industries GmbH, Niederwinkling (DE)

( * ) Notice: Subject to any disclaimer, the term of this patent is extended or adjusted under 35 U.S.C. 154(b) by 142 days.

This patent is subject to a terminal disclaimer.

(21) Appl. No.: 18/736,218

(22) Filed: Jun. 6, 2024

(65) Prior Publication Data

US 2024/0331719 A1 Oct. 3, 2024

Related U.S. Application Data

(63) Continuation of application No. 17/626,104, filed as application No. PCT/EP2019/068599 on Jul. 10, 2019, now Pat. No. 12,033,653.

(51) Int. Cl.

| | |
|---|---|
| ***G10L 21/0272*** | (2013.01) |
| ***G10L 21/013*** | (2013.01) |
| ***G10L 21/0208*** | (2013.01) |

(52) U.S. Cl.

CPC ........ *G10L 21/0272* (2013.01); *G10L 21/013* (2013.01); *G10L 21/0208* (2013.01); *G10L 2021/02082* (2013.01)

(58) Field of Classification Search

CPC ............... G10L 21/0272; G10L 21/013; G10L 21/0208; G10L 2021/02082; G10L 21/02; G10L 2021/02087

See application file for complete search history.

(56) References Cited

U.S. PATENT DOCUMENTS 9,076,421 B1 * 7/2015 Munoz ................. H04R 1/1041
12,033,653 B2 * 7/2024 Kotulla .................. G10H 1/366
2006/0050894 A1 * 3/2006 Boddicker ............. G10H 1/361 381/86
2006/0083390 A1 * 4/2006 Kaderavek ............. H04R 1/406 381/91

(Continued)

*Primary Examiner* — Fariba Sirjani

(74) *Attorney, Agent, or Firm* — Rimon PC

(57) ABSTRACT

Apparatus (2) for outputting an audio signal (3) in a vehicle cabin (4), the apparatus (2) comprising:

at least one audio outputting device (6) configured to output an audio signal (3), particularly an audio signal (3) comprising at least one audio signal component containing a human voice, particularly a singer's voice, in a vehicle cabin (4);

at least one audio receiving device (10) configured to receive a human voice signal (9) of at least one person (P) located in the or a vehicle cabin (4) whilst the at least one audio outputting device (6) outputs the audio signal (3) in the or a vehicle cabin (4);

at least one processing device (11) configured to combine the audio signal (3) and the received human voice signal (9) so as to generate a combined audio signal containing the audio signal (3) and the received human voice signal (9) which combined audio signal is outputtable or output in the or a vehicle cabin (4) via the at least one audio outputting device (6).

18 Claims, 1 Drawing Sheet

(56) References Cited

U.S. PATENT DOCUMENTS

| | | | | |
|---|---|---|---|---|
| 2008/0184870 | A1* | 8/2008 | Toivola | G10H 1/365 84/610 |
| 2010/0107856 | A1* | 5/2010 | Hetherington | G10H 1/366 84/610 |
| 2018/0308462 | A1* | 10/2018 | Wang | G10H 1/365 |
| 2020/0258536 | A1* | 8/2020 | Zhang | H04R 1/083 |
| 2024/0331719 | A1* | 10/2024 | Kotulla | G10L 21/0272 |

* cited by examiner

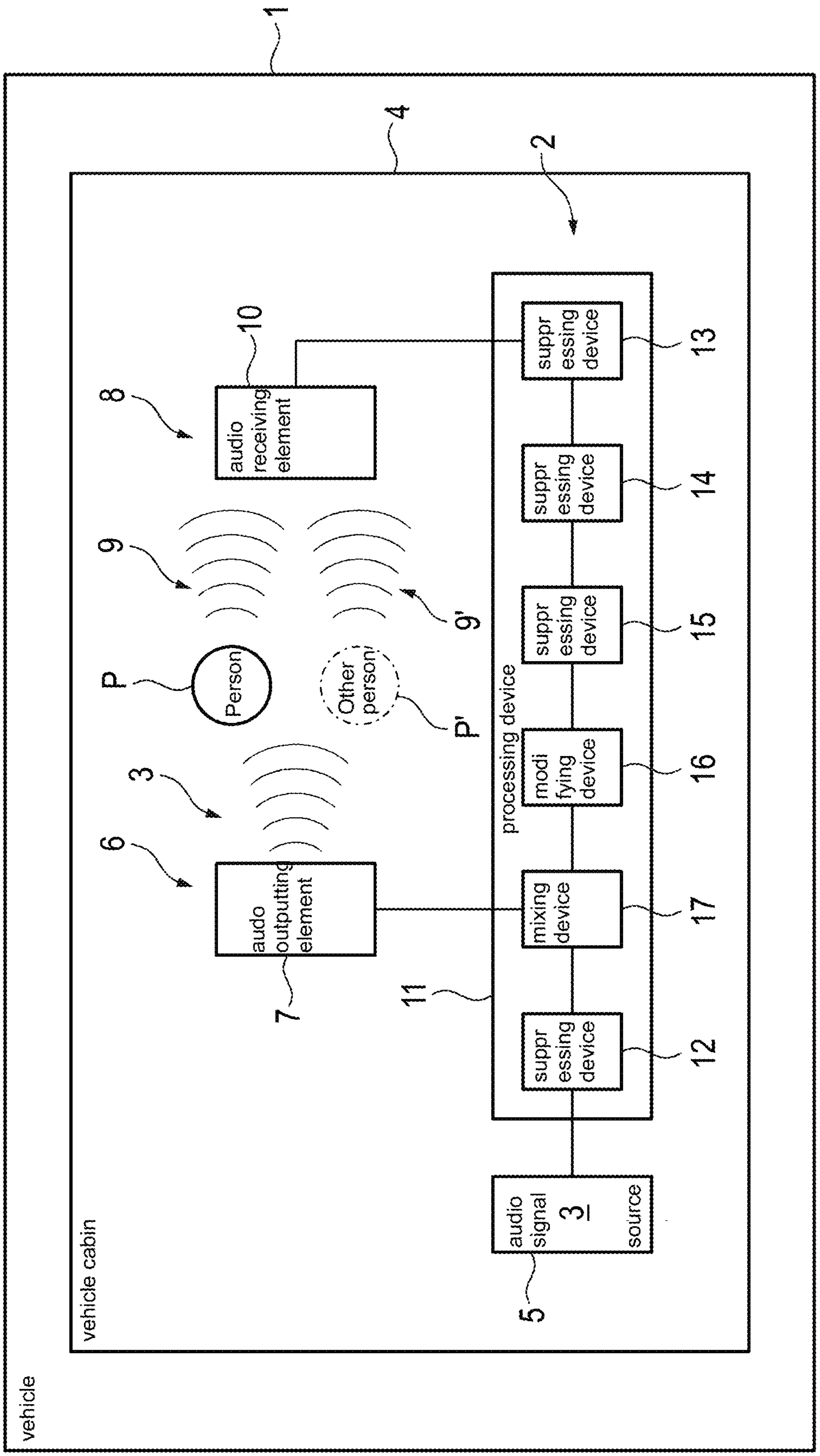
1
4
2
vehicle
vehicle cabin
audio signal source
3
5
processing device
11
suppr essing device
12
mixing device
17
modi fying device
16
suppr essing device
15
suppr essing device
14
suppr essing device
13
audo outputting element
6
7
3
Person
P
Other person
P'
9
9'
audio receiving element
8
10

APPARATUS FOR OUTPUTTING AN AUDIO SIGNAL IN A VEHICLE CABIN

The invention refers to an apparatus for outputting an audio signal in a vehicle cabin, the apparatus comprising at least one audio outputting device configured to output an audio signal, particularly an audio signal comprising at least one audio signal component containing a human voice, particularly a singer's voice, in a vehicle cabin.

Apparatuses for outputting an audio signal in a vehicle cabin, which audio signal typically, comprises at least one audio signal component containing a human voice, particularly a singer's voice, in a vehicle cabin, are generally known from prior art.

A drawback of these known apparatuses is that they are typically, complex in design, e.g. require special external hardware, for implementing special operational modes of the apparatus, such as Karaoke-modes, in which one or more persons in the vehicle cabin can sing along an audio signal, i.e. typically a musical piece, which is output in the vehicle cabin via the apparatus. This makes an easy and reliable use of respective special operational modes, e.g. Karaoke-modes, cumbersome and difficult as the user has to provide the required external hardware and set it up in the vehicle cabin.

It is the object of the present invention to provide an apparatus for outputting an audio signal in a vehicle cabin allowing for an improved, i.e. particularly easy and reliable, implementation of special operational modes, such as Karaoke-modes, which particularly does not require any external hardware which needs to be set up in the vehicle cabin.

This object is achieved by an apparatus for outputting an audio signal in a vehicle cabin according to claim 1. The Claims depending on claim 1 refer to possible embodiments of the apparatus.

A first aspect of the invention refers to an apparatus (hereinafter "the apparatus") for outputting an audio signal, i.e. particularly an audio signal representing a musical piece including vocals, such as a pop song, a rock song, a hip-hop song, a classical song, etc., in a vehicle cabin of a vehicle. The apparatus can be implemented as a vehicle audio system or form part of a vehicle audio system. The term "outputting" is generally, to be understood as outputting as sound or playing back an audio signal.

The apparatus is configured to output and/or reproduce an audio signal, i.e. particularly an audio signal representing a musical piece including vocals, such as a pop song, a rock song, a hip-hop song, a classical song, etc., comprising at least one audio signal component containing a received human voice, particularly a singer's voice, in a vehicle cabin.

A respective audio signal may be provided from any audio signal source, such as a data carrier device, such as USB-stick, a radio device, such as a FM radio, a network device, such as a network application, a mobile device, such as a smartphone, smartwatch, tablet, notebook, etc. The apparatus may thus, be connectable or connected with a respective audio signal source.

The apparatus comprises at least one audio outputting device configured to output and/or reproduce at least one audio signal, particularly an audio signal comprising at least one audio signal component containing a human voice, particularly a singer's voice, in a vehicle cabin. The at least one audio outputting device typically, comprises one or more audio outputting elements, such as loudspeakers. Each audio outputting element may be assigned to a specific location or space, i.e. particularly to a specific seat, in the or a vehicle cabin of a vehicle being equipped with the apparatus. The one or more audio outputting elements are typically, arrangeable or arranged so as to output a respective audio signal in the or a vehicle cabin. The one or more audio outputting elements may be arrangeable or arranged at and/or in structural elements, e.g. instrument panels, pillars, doors, ceiling, etc., of a vehicle being equipped with the apparatus. Notably, the one or more audio outputting elements and the at least one audio outputting device, respectively can be standard components of a vehicle audio system implemented by the apparatus. Hence, at least from a structural point of view, the at least one audio outputting device of the apparatus can be a standard audio outputting device of a vehicle audio system.

The apparatus further comprises at least one audio receiving device configured to receive a human voice signal, e.g. the voice of at least one person singing along an audio signal, particularly a musical piece, of at least one person located in the or a vehicle cabin of the or a vehicle equipped with the apparatus whilst the at least one audio outputting device outputs the or an audio signal in the or a vehicle cabin. The term "person" generally refers to any person in the or a vehicle cabin, such as a driver or co-driver, for instance.

The at least one audio receiving device typically, comprises one or more audio receiving elements, such as microphones. Each audio receiving element may be assigned to a specific location or space, i.e. particularly to at least one specific seat, in the or a vehicle cabin of a vehicle being equipped with the apparatus. The one or more audio receiving elements may be arrangeable or arranged at and/or in structural elements, e.g. instrument panels, pillars, doors, ceiling, etc., of a vehicle being equipped with the apparatus so as to receive a human voice signal of at least one person located in the or a vehicle cabin of the or a vehicle equipped with the apparatus whilst the at least one audio outputting device outputs the audio signal in the or a vehicle cabin of the or a vehicle. Notably, the one or more audio receiving elements and the at least one audio receiving device, respectively can be standard components of a vehicle audio system implemented by the apparatus. Hence, at least from a structural point of view, the at least one audio receiving device of the apparatus can be a standard audio receiving device of a vehicle audio system.

The at least one audio receiving device, thus allows for live receiving a human voice, i.e. the voice of at least one person, in a vehicle cabin during outputting an audio signal in the or a vehicle cabin via the at least one audio outputting device. The receiving of the human voice in the vehicle cabin via the at least one audio receiving device may thus, take place simultaneously with outputting an audio signal in the vehicle cabin via the at least one audio outputting device.

This simultaneous outputting of audio signals in the or a vehicle cabin and receiving of human voices in the or a vehicle cabin may form basis for implementing special operational modes, such as Karaoke-modes, with the apparatus. As will be more apparent from below, the one or more audio receiving elements may also be arrangeable or arranged so as to receive noise, particularly noise from an external noise source, acoustically perceivable in the or a vehicle cabin and/or receive undesired noise in the or a vehicle cabin, particularly acoustic feedback, generated by receiving an audio signal which is outputtable or output in the or a vehicle cabin via the at least one audio receiving device.

The apparatus further comprises at least one hardware- and/or software-embodied processing device, particularly a signal processing device, configured to combine, e.g. by audio mixing, the audio signal which is to be output or output in the or a vehicle cabin and the received human voice signal so as to generate a combined audio signal containing the audio signal and the received human voice signal. The combined audio signal is outputtable or output in the or a vehicle cabin of the or a vehicle via the at least one audio outputting device. The processing device thus, allows for generating a combined audio signal which comprises both audio content of an actual audio signal and a received human voice signal. In other words, the combined audio signal allows for simultaneously outputting the audio signal, e.g. a musical piece, and the received human voice signal, e.g. the voice of a person singing along the audio signal. As a result, special operational modes, i.e. particularly a Karaoke mode, can be implemented.

The at least one audio outputting device is thus, configured to output a respective combined audio signal in the or a vehicle cabin. Outputting the combined audio signal in the or a vehicle cabin typically, means that the audio signal, which can be modified as will be explained in more detail below, and the received human voice signal, which can be modified as will be explained in more detail below, are simultaneously output in the or a vehicle cabin. The at least one audio outputting device may thus, be configured to output, in a vehicle cabin, a respective combined audio signal, i.e. an audio signal comprising at least one audio signal component, e.g. a musical piece, containing a human voice, particularly a singer's voice, and a received human voice signal of at least one person singing along the audio signal in the or a vehicle cabin.

As the one or more audio outputting elements and the at least one audio outputting device, respectively as well as the one or more audio receiving elements and the at least one audio receiving device, respectively can be standard components of vehicle audio system, the apparatus allows for implementing respective special operational modes, i.e. particularly a Karaoke-mode, with standard components of a vehicle audio system. As such, respective special operational modes, i.e. particularly a Karaoke-mode, can be implemented in easy and reliable manner without providing special external hardware.

The processing device or a hardware- and/or software-embodied suppressing device assignable or assigned to the processing device may be configured to suppress an audio signal component containing a human voice, particularly a singer's voice, in an audio signal which is outputtable or output in the or a vehicle cabin. The processing device or the suppressing device may thus, (also) be deemed or denoted as a vocal suppressor. As such, as indicated above, the audio signal can be modified. Modifying an audio signal can particularly, be implemented by suppressing the or at least one audio signal component which contains a human voice, particularly a singer's voice. As a consequence, the combined audio signal can comprise a modified audio signal, i.e. particularly an audio signal with suppression of the (original) audio signal component containing a human voice, particularly a singer's voice. Put briefly, the processing device is configured to generate a modified audio signal which differs from an original audio signal by a suppression of the audio signal component which contains a human voice, particularly a singer's voice. The suppressing device may be embodied as or comprise one or more suitable filter devices.

The processing device or the suppression device may be configured to suppress a respective audio signal component containing a human voice, particularly a singer's voice, with a pre-definable or pre-defined dynamic or static suppression level. Thereby, a suppression level of 0% means no suppression of the respective audio signal component such that the audio signal is output with no suppression of the respective audio signal component and a suppression level of 100% means complete suppression of the audio signal component such that the audio signal is output with complete suppression of the respective audio signal component. In other words, suppression either results in reducing the energy level, i.e. particularly a volume level, of the respective audio signal component or (completely) cancelling the respective audio signal component. In either case, suppressing a respective audio signal component typically, results in a clearer output result of a received human voice signal and thus, a clearer acoustic perceivability of the received human voice signal.

Suppressing an audio signal component containing the human voice may require determining and/or extracting the respective audio signal component containing the human voice which is to be suppressed in the audio signal. The processing device or the suppressing device may thus, be configured to determine and/or extract the respective audio signal component which is to be suppressed in the audio signal or from the audio signal, respectively. This determination and/or extraction may be realized by analyzing the acoustic properties, e.g. the frequency spectrum, of the audio signal with regard to (characteristic) acoustic properties, e.g. a specific frequency range, which can be assigned to the audio signal component containing the human voice, e.g. the singer's voice, and/or which can be distinguished from audio signal components not containing the human voice, e.g. containing instruments. Particularly, the processing device or the suppressing device may be configured to extract an audio signal component containing a human voice, particularly a singer's voice, from an audio signal which is outputtable or output in the or a vehicle cabin and to separate an extracted audio signal component containing a human voice, particularly a singer's voice, from other audio signal components not containing a human voice, particularly a singer's voice, of the respective audio signal. Once determined and/or extracted in respective manner, the audio signal component containing the or a human voice may be suppressed as specified above.

The processing device may be configured to extract the respective audio signal component from the audio signal via splitting of the audio signal in a plurality of audio signal components. Thereby, one audio signal component obtained via splitting the audio signal in the plurality of audio signal components represents the audio signal component which contains the or a human voice, particularly the singer's voice. Splitting of the audio signal may comprise analyzing the audio signal with regard to the respective audio signal component which is to be split from other audio signal components not containing the or a human voice, particularly a singer's voice. The analysis of the audio signal can be performed on basis of pre-definable or pre-defined acoustic properties, e.g. amplitude and/or frequency, of audio signal components containing the or a human voice, particularly a singer's voice.

Additionally or alternatively, the processing device or a hardware- and/or software-embodied splitting device assignable or assigned to the processing device may be configured to split the audio signal in a plurality of audio signal components so as to obtain at least a center signal component, a left signal component, and a right signal component. The center signal component is the or a component of the audio signal which represents the or an audio signal component which is acoustically perceived by a person as being output from a center direction and/or center position of the at least one audio outputting device comprising a left audio output channel and a right audio output channel. The left signal component is the or a component of the audio signal which represents an audio signal component which is acoustically perceived by a person as being output from a (more) left direction and/or left position with respect to a center direction and/or center position of the at least one audio outputting device comprising a left audio output channel and a right audio output channel. The right signal component is the or a component of the audio signal which represents an audio signal component which is acoustically perceived by a person as being output from a (more) right direction and/or right position with respect to a center direction and/or center position of the at least one audio outputting device comprising a left audio output channel and a right audio output channel.

A respective splitting up of the audio signal in a respective center signal component, a left signal component, and a right signal component is based on the insight that the center component typically, contains the human voice, particularly the singer's voice. Hence, when obtaining the center component, one typically also obtains the audio signal component which contains the human voice, particularly the singer's voice.

In this case, the audio signal is typically, a stereo signal comprising a left and a right audio signal component.

The at least one audio receiving device may be configured to receive a human voice signal of at least one first person located in the or a vehicle cabin and a human voice signal of at least one further person located in the or a vehicle cabin. Thereby, the at least one processing device may be further configured to modify the received human voice signal of the at least one first person located in the or a vehicle cabin with at least one first acoustic modification parameter and to modify the received human voice signal of the at least one further person located in the or a vehicle cabin with at least one further acoustic modification parameter. It may be required to separate the received human voice signal of at least one first person, which embraces also a group of first persons, from the received human voice signal of at least one further person, which embraces also a group of further persons, for processing the respective received human voice signals differently. Examples for different processing of respective received human voice signals are varying pitch and/or adding reverberation differently.

The at least one audio receiving device may be configured to receive a human voice signal of at least one first person, e.g. the driver, co-driver, etc., located in the or a vehicle cabin and a human voice signal of at least one further person located in the or a vehicle cabin. Thereby, the processing device or a suppressing device assignable or assigned to the processing device may be further configured to suppress the received human voice signal of the at least one further person located in the vehicle cabin and to generate a resulting received human voice signal which contains (only) the human voice signal of the at least one first person and a suppressed human voice signal of the at least one further person. As such, the received human voice of at least one first person, which embraces also a group of first persons, may be separated from the received voice of at least one further person, which embraces also a group of further persons; by suppressing the received human voice signal of the at least one further person. The suppression of the received human voice signal of the at least one further person may be performed with dynamic or static suppression levels ranging from 100% (complete suppression) to 0% (no suppression). Suppressing the received human voice signals of the at least one further person may require separating the human voice signals of the at least one further person from the human voice signals of the at least one first person or vice versa. In this regard, the above annotations regarding the determination and/or extraction of specific audio signal components from an audio signal apply in analogous manner. The suppressing device may be embodied as or comprise one or more suitable filter devices.

Enabling different received human voice signals to be processed and/or suppressed differently, and output from different audio outputting elements, e.g. loudspeakers, can increase "excitement" in a Karaoke mode of the apparatus. When there are multiple audio receiving elements, e.g. microphones, it could be useful to automatically select the audio receiving element receiving, e.g. the clearest human voice signal, and mute the other audio receiving elements—this can be deemed as a form of noise suppression. Further, multiple received human voice signals can be processed and summed into one signal, so as to boost voice and suppress noise—can be deemed as microphone beamforming.

The at least one audio receiving device may be configured to receive a human voice signal of at least one person located in the or a vehicle cabin and noise, particularly noise from an external noise source i.e. particularly a noise source outside the or a vehicle cabin or outside the vehicle, acoustically perceivable in the or a vehicle cabin. Thereby, the processing device or a suppressing device assignable or assigned to the processing device may be configured to suppress the noise acoustically perceivable in the or a vehicle cabin and to generate a resulting received human voice signal which contains the human voice signal of the at least one person and suppressed noise. As such, the received human voice of a person may be separated from received signals of e.g. an external noise source acoustically perceivable in the or a vehicle cabin. The suppression of the signals of the received noise acoustically perceivable in the or a vehicle cabin may be performed with dynamic or static suppression levels ranging from 100% (complete suppression) to 0% (no suppression). Suppressing the signals of the received noise acoustically perceivable in the or a vehicle cabin may require separating the human voice signals from the signals of the received noise acoustically perceivable in the or a vehicle cabin or vice versa. In this regard, the above annotations regarding the determination and/or extraction of specific audio signal components from an audio signal apply in analogous manner. The suppressing device may be embodied as or comprise one or more suitable filter devices.

The processing device or a hardware- and/or software-embodied suppressing device assignable or assigned to the processing device may be additionally or alternatively configured to suppress undesired noise in the or a vehicle cabin, particularly acoustic feedback, generated by receiving the audio signal which is outputtable or output in the or a vehicle cabin via the at least one audio outputting device. As such, undesired noise in the or a vehicle cabin, particularly acoustic feedback, generated by receiving the audio signal which is outputtable or output in the or a vehicle cabin via the at least one audio outputting device can be suppressed. The suppression of the undesired noise generated by receiving the audio signal which is outputtable or output in the or a vehicle cabin via the at least one audio outputting device can be performed with dynamic or static suppression levels ranging from 100% (complete suppression) to 0% (no suppression). Suppressing the signals of the undesired noise generated by receiving the audio signal which is outputtable or output in the or a vehicle cabin may require separating the human voice signals from the undesired noise signals generated by receiving the audio signal which is outputtable or output in the or a vehicle cabin or vice versa. In this regard, the above annotations regarding the determination and/or extraction of specific audio signal components from an audio signal apply in analogous manner. The suppressing device may be embodied as or comprise one or more suitable filter devices.

The processing device or a hardware- and/or software-embodied modifying device assignable or assigned to the processing device may further be configured to modify at least one acoustically perceivable parameter, particularly the pitch and/or the reverberation, of at least one audio signal component of the audio signal which is outputtable or output in the or a vehicle cabin, particularly an audio signal component containing a human voice, particularly a singer's voice, and/or configured to modify at least one acoustically perceivable parameter, particularly the pitch and/or the reverberation, of the or a received human voice signal of at least one person in the or a vehicle cabin. The processing device or the modifying device may thus, (also) deemed or denoted as a sound enhancer. Modifying acoustically perceivable parameters, such as the pitch and/or the reverberation, of a respective audio signal component and/or a respective received human voice signal allows for concertedly adjusting the acoustically perceivable parameters of a respective combined audio signal and thus, the acoustic playback situation in the or a vehicle cabin which may be useful for implementing special operational modes such as a Karaoke-mode, for instance. As an example, the received human voice signal of a singing person may be acoustically adapted to the musical piece the person sings along by varying pitch and/or adding reverberation or vice versa.

Modifying of at least one acoustically perceivable parameter, particularly the pitch and/or the reverberation, of at least one audio signal component of the audio signal which is outputtable or output in the or a vehicle cabin may also require determining and/or extracting the respective audio signal component which is to be modified. In this regard, the above annotations regarding the determination and/or extraction of specific audio signal components from an audio signal apply in analogous manner. The same applies to modifying of at least one acoustically perceivable parameter, particularly the pitch and/or the reverberation, of a received human voice signal.

The at least one audio receiving device may be built as or may comprise at least one mobile, particularly hand-held, audio receiving element. A respective mobile audio receiving element may be embodied as a mobile, particularly hand-held, microphone. A mobile microphone can be embodied as a wired microphone or a wireless microphone.

At least one mobile audio receiving element may be assignable or assigned to at least one person seat in the or a vehicle cabin. Hence, the apparatus may distinguish received human person voices based on the assignment of the respective audio receiving elements to the respective person seats in the or a vehicle cabin.

It is also conceivable case that the at least one audio receiving device comprises a plurality of mobile, particularly hand-held, audio receiving elements, whereby the receiving level of the respective mobile audio receiving elements is individually adjustable. As such, signals representing at least one main voice and signals representing at least one subsidiary voice can be implemented.

It is also conceivable that microphones provided with mobile terminals, e.g. smartphones, smartwatches, tablets, notebooks, etc., of at least one person could be used a mobile audio receiving element. In this case, a respective mobile terminal needs to be connected with the apparatus which can be achieved by a wired or wireless connection. As an example, Bluetooth- or WIFI-connections could be established in the or a vehicle cabin.

A second aspect of the invention refers to a hardware- and/or software-embodied processing device for an apparatus according to the first aspect of the invention. The processing device is configured to combine, e.g. to mix, an audio signal and a received human voice signal so as to generate a combined audio signal containing the audio signal and the received human voice signal which is outputtable in the or a vehicle cabin via at least one audio outputting device.

All annotations regarding the apparatus of the first aspect of the invention apply mutatis mutandis to the processing device of the second aspect of the invention.

A third aspect of the invention refers to a vehicle, particularly a passenger vehicle, such as a car, a truck, a van, etc., comprising a vehicle cabin and an apparatus according to the first aspect of the invention. The apparatus is configured to output an audio signal in the or a vehicle cabin.

All annotations regarding the apparatus of the first aspect of the invention apply mutatis mutandis to the vehicle of the third aspect of the invention.

A fourth aspect of the invention refers to a method for outputting and/or reproducing an audio signal in a vehicle cabin. The method comprises the steps of:

- outputting, particularly via at least one audio outputting device, an audio signal, particularly an audio signal comprising at least one audio signal component containing a human voice, particularly a singer's voice, in a vehicle cabin;
- receiving, particularly via at least one audio receiving device, a human voice signal of at least one person located in the whilst outputting the audio signal in the vehicle cabin;
- combining, via at least one processing device, the audio signal and the received human voice signal so as to generate a combined audio signal containing the audio signal and the received human voice signal; and
- outputting and/or reproducing, via the at least one audio outputting device, the combined audio signal in the vehicle cabin.

All annotations regarding the apparatus of the first aspect of the invention apply mutatis mutandis to the method of the fourth aspect of the invention.

Exemplary embodiments of the invention are described with reference to the FIG., whereby the sole FIG. shows a principle drawing of a vehicle comprising an apparatus according to an exemplary embodiment.

The sole FIG. shows a principle drawing of a vehicle 1 comprising an apparatus 2 according to an exemplary embodiment.

The apparatus 2 is configured to output and/or reproduce an audio signal 3, i.e. particularly an audio signal 3 representing a musical piece including vocals, such as a pop song, a rock song, a hip-hop song, a classical song, etc., comprising at least one audio signal component containing a received human voice, particularly a singer's voice, in a vehicle cabin 4 of the vehicle 1.

The audio signal 3 may be provided from any audio signal source 5, such as a data carrier device, such as USB-stick, a radio device, such as a FM radio, a network device, such as a network application, a mobile device, such as a smartphone, smartwatch, tablet, notebook, etc. The apparatus 2 is thus, connectable or connected with a respective audio signal source 5.

The apparatus 2 comprises an audio outputting device 6 configured to output and/or reproduce an audio signal 3, particularly an audio signal 3 comprising at least one audio signal component containing a human voice, particularly a singer's voice, in the vehicle cabin 4. The audio outputting device 6 comprises one or more audio outputting elements 7, such as loudspeakers. Each audio outputting element 7 may be assigned to a specific location or space, i.e. particularly to a specific sea (not shown), in the vehicle cabin 4. The audio outputting elements 7 are arrangeable or arranged so as to output a respective audio signal 3 in the vehicle cabin 4. The audio outputting elements 7 may be arrangeable or arranged at and/or in structural elements, e.g. instrument panels, pillars, doors, ceiling, etc., of the vehicle. Notably, the audio outputting elements 7 and the audio outputting device 6, respectively can be standard components of a vehicle audio system implemented by the apparatus 2. Hence, at least from a structural point of view, the audio outputting device 6 of the apparatus 2 can be a standard audio outputting device 6 of a vehicle audio system.

The apparatus 2 further comprises an audio receiving device 8 configured to receive a human voice signal 9, e.g. the voice of at least one person P singing along an audio signal 3, particularly a musical piece, of at least one person P located in the vehicle cabin 4 whilst the audio outputting device 6 outputs the audio signal 3 in the vehicle cabin 4. The audio receiving device 8 comprises one or more audio receiving elements 10, such as microphones. Each audio receiving element 10 may be assigned to a specific location or space, i.e. particularly to at least one specific seat, in the vehicle cabin 4. The audio receiving elements 10 are arrangeable or arranged at and/or in structural elements, e.g. instrument panels, pillars, doors, ceiling, etc., of the vehicle 2 so as to receive a human voice signal of at least one person P located in the vehicle cabin 4 whilst the audio outputting device 6 outputs the audio signal 3 in the vehicle cabin 4. Notably, the audio receiving elements 10 and the audio receiving device 8, respectively can be standard components of a vehicle audio system implemented by the apparatus 2. Hence, at least from a structural point of view, the audio receiving device 8 of the apparatus 2 can be a standard audio receiving device of a vehicle audio system.

The audio receiving device 8, thus allows for live receiving a human voice, i.e. the voice of at least one person P, in the vehicle cabin 4 during outputting an audio signal 3 in the vehicle cabin 4 via the audio outputting device 6. The receiving of the human voice of the at least one person P in the vehicle cabin 4 via the audio receiving device 8 may thus, take place simultaneously with outputting an audio signal 3 in the vehicle cabin 4 via the audio outputting device 6.

This simultaneous outputting of audio signals 3 in the vehicle cabin 4 and receiving of human voices in the vehicle cabin 4 may form basis for implementing special operational modes such as Karaoke-modes with the apparatus 2. As will be more apparent from below, the audio receiving elements 10 may also be arrangeable or arranged so as to receive noise, particularly noise from an external noise source (not shown), acoustically perceivable in the vehicle cabin 4 and/or to receive undesired noise in the vehicle cabin 4, particularly acoustic feedback, generated by receiving an audio signal 3 which is outputtable or output in the vehicle cabin 4 via the audio receiving device 8.

The apparatus 2 further comprises a hardware- and/or software-embodied processing device 11, particularly a signal processing device, configured to combine, e.g. by audio mixing via mixing device 17, the audio signal 3 which is to be output or output in the vehicle cabin 4 and the received human voice signal 9 so as to generate a combined audio signal containing the audio signal 3 and the received human voice signal 9. The combined audio signal is outputtable or output in the vehicle cabin 4 via the audio outputting device 6. The processing device 11 thus, allows for generating a combined audio signal which comprises both audio content of an actual audio signal 3 and a received human voice signal 9. In other words, the combined audio signal allows for simultaneously outputting the audio signal 3, e.g. a musical piece, and the received human voice signal 9, e.g. the voice of a person P singing along the audio signal 3. As a result, special operational modes, i.e. particularly a Karaoke mode, can be implemented.

The audio outputting device 6 is thus, configured to output a respective combined audio signal in the vehicle cabin 4. Outputting the combined audio signal in the vehicle cabin 4 means that the audio signal 3, which can be modified as will be explained in more detail below, and the received human voice signal 9, which can be modified as will be explained in more detail below, are simultaneously output in the vehicle cabin 4. The audio outputting device 6 may thus, be configured to output, in the vehicle cabin 4, a respective combined audio signal, i.e. an audio signal 3 comprising at least one audio signal component, e.g. a musical piece, containing a human voice, particularly a singer's voice, and a received human voice signal 9 of at least one person P singing along the audio signal 3 in the vehicle cabin 4.

As the audio outputting elements 7 and the audio outputting device 6, respectively as well as the audio receiving elements 10 and the audio receiving device 8, respectively can be standard components of vehicle audio system, the apparatus 2 allows for implementing respective special operational modes, i.e. particularly a Karaoke-mode, with standard components of a vehicle audio system. As such, respective special operational modes, i.e. particularly a Karaoke-mode, can be implemented in easy and reliable manner without providing special external hardware.

The processing device 11 or a hardware- and/or software-embodied suppressing device 12 assignable or assigned to the processing device 11 may be configured to suppress an audio signal component containing a human voice, particularly a singer's voice, in an audio signal 3 which is outputtable or output in the vehicle cabin 4. The processing device 11 or the suppressing device 12 may thus, (also) be deemed or denoted as a vocal suppressor. As such, as indicated above, the audio signal 3 can be modified. Modifying an audio signal 3 can particularly, be implemented by suppressing the or at least one audio signal component which contains a human voice, particularly a singer's voice. As a consequence, the combined audio signal can comprise a modified audio signal, i.e. particularly an audio signal 3 with suppression of the (original) audio signal component containing a human voice, particularly a singer's voice. Put briefly, the processing device 11 is configured to generate a modified audio signal which differs from an original audio signal 3 by a suppression of the audio signal component which contains a human voice, particularly a singer's voice.

The processing device 11 or the suppression device 12 may be configured to suppress a respective audio signal component containing a human voice, particularly a singer's voice, with a pre-definable or pre-defined dynamic or static suppression level. Thereby, a suppression level of 0% means no suppression of the respective audio signal component such that the audio signal 3 is output with no suppression of the respective audio signal component and a suppression level of 100% means complete suppression of the audio signal component such that the audio signal 3 is output with complete suppression of the respective audio signal component. In other words, suppression either results in reducing the energy level, i.e. particularly a volume level, of the respective audio signal component or (completely) cancelling the respective audio signal component. In either case, suppressing a respective audio signal component typically, results in a clearer output result of a received human voice signal 9 and thus, a clearer acoustic perceivability of the received human voice signal 9.

Suppressing an audio signal component containing the human voice may require determining and/or extracting the respective audio signal component containing the human voice which is to be suppressed in the audio signal 3. The processing device 11 or the suppressing device 12 may thus, be configured to determine and/or extract the respective audio signal component which is to be suppressed in the audio signal 3 or from the audio signal 3, respectively. This determination and/or extraction may be realized by analyzing the acoustic properties, e.g. the frequency spectrum, of the audio signal 3 with regard to (characteristic) acoustic properties, e.g. a specific frequency range, which can be assigned to the audio signal component containing the human voice, e.g. the singer's voice, and/or which can be distinguished from audio signal components not containing the human voice, e.g. containing instruments. Particularly, the processing device 11 or the suppressing device 12 may be configured to extract an audio signal component containing a human voice, particularly a singer's voice, from an audio signal 3 which is outputtable or output in the vehicle cabin 4 and to separate an extracted audio signal component containing a human voice, particularly a singer's voice, from other audio signal components not containing a human voice, particularly a singer's voice, of the respective audio signal 3. Once determined and/or extracted in respective manner, the audio signal component containing the or a human voice may be suppressed as specified above.

The processing device 11 may be configured to extract the respective audio signal component from the audio signal 3 via splitting of the audio signal 3 in a plurality of audio signal components. Thereby, one audio signal component obtained via splitting the audio signal 3 in the plurality of audio signal components represents the audio signal component which contains the or a human voice, particularly the singer's voice. Splitting of the audio signal 3 may comprise analyzing the audio signal 3 with regard to the respective audio signal component which is to be split from other audio signal components not containing the or a human voice, particularly a singer's voice. The analysis of the audio signal 3 can be performed on basis of pre-definable or pre-defined acoustic properties, e.g. amplitude and/or frequency, of audio signal components containing the or a human voice, particularly a singer's voice.

Additionally or alternatively, the processing device 11 or a hardware- and/or software-embodied splitting device (not shown) assignable or assigned to the processing device 11 may be configured to split the audio signal 3 in a plurality of audio signal components so as to obtain at least a center signal component, a left signal component, and a right signal component. The center signal component is the or a component of the audio signal 3 which represents the or an audio signal component which is acoustically perceived by a person P as being output from a center direction and/or center position of the or an audio outputting device 6. The left signal component is the or a component of the audio signal 3 which represents an audio signal component which is acoustically perceived by a person P as being output from a (more) left direction and/or left position with respect to a center direction and/or center position of the audio outputting device 6. The right signal component is the or a component of the audio signal 3 which represents an audio signal component which is acoustically perceived by a person P as being output from a (more) right direction and/or right position with respect to a center direction and/or center position of the audio outputting device 6. This particularly, applies for a configuration of the audio outputting device 6 comprising a left audio output channel and a right audio output channel.

A respective splitting up of the audio signal 3 in a respective center signal component, a left signal component, and a right signal component is based on the insight that the center component typically, contains the human voice, particularly the singer's voice. Hence, when obtaining the center component, one typically also obtains the audio signal component which contains the human voice, particularly the singer's voice.

In this case, the audio signal 3 is typically, a stereo signal comprising a left and a right audio signal component.

The audio receiving device 8 may be configured to receive a human voice signal 9 of at least one first person P located in the vehicle cabin 4 and a human voice signal 9' of at least one further person P' located in the vehicle cabin 4. Thereby, the processing device 11 may be further configured to modify the received human voice signal 9 of the at least one first person P located in the vehicle cabin 4 with at least one first acoustic modification parameter and to modify the received human voice signal 9' of the at least one further person P' located in the vehicle cabin 4 with at least one further acoustic modification parameter. It may be required to separate the received human voice signal 9 of at least one first person P, which embraces also a group of first persons, from the received human voice signal of at least one further person P', which embraces also a group of further persons, for processing the respective received human voice signals 9, 9' differently. Examples for different processing of respective received human voice signals 9, 9' are varying pitch and/or adding reverberation differently.

The audio receiving device 8 may be configured to receive a human voice signal 9 of at least one first person P, e.g. the driver, co-driver, etc., located in the vehicle cabin 4 and a human voice signal 9' of at least one further person P' located in the vehicle cabin 4. Thereby, the processing device 11 or a suppressing device 13 assignable or assigned to the processing device 11 may be further configured to suppress the received human voice signal 9' of the at least one further person P' located in the vehicle cabin 4 and to generate a resulting received human voice signal which contains (only) the human voice signal 9 of the at least one first person P and a suppressed human voice signal 9' of the at least one further person P'. As such, the received human voice of at least one first person 9, which embraces also a group of first persons 9, may be separated from the received voice of at least one further person 9', which embraces also a group of further persons 9', by suppressing the received human voice signal 9' of the at least one further person P'. The suppression of the received human voice signal 9' of the at least one further person P' may be performed with dynamic or static suppression levels ranging from 100% (complete suppression) to 0% (no suppression). Suppressing the received human voice signal 9' of the at least one further person P' may require separating the human voice signals 9' of the at least one further person P' from the human voice signals 9 of the at least one first person P or vice versa. In this regard, the above annotations regarding the determination and/or extraction of specific audio signal components from an audio signal 3 apply in analogous manner.

The audio receiving device 8 may be configured to receive a human voice signal 9 of at least one person P located in the vehicle cabin 4 and noise, particularly noise from an external noise source (not shown), i.e. particularly a noise source outside the vehicle cabin 4 or outside the vehicle 1, acoustically perceivable in the vehicle cabin 4. Thereby, the processing device 11 or a suppressing device 14 assignable or assigned to the processing device 11 may be configured to suppress the noise acoustically perceivable in the vehicle cabin 4 and to generate a resulting received human voice signal which contains the human voice signal 9 of the person P and suppressed noise. As such, the received human voice of a person P may be separated from received signals of noise acoustically perceivable in the vehicle cabin 4. The suppression of the signals of the received noise acoustically perceivable in the vehicle cabin 4 may be performed with dynamic or static suppression levels ranging from 100% (complete suppression) to 0% (no suppression). Suppressing the signals of the received noise acoustically perceivable in the vehicle cabin 4 may require separating the human voice signals from the signals of the received noise acoustically perceivable in the vehicle cabin 4 or vice versa. In this regard, the above annotations regarding the determination and/or extraction of specific audio signal components from an audio signal 3 apply in analogous manner.

The processing device 11 or a hardware- and/or software-embodied suppressing device 15 assignable or assigned to the processing 11 device may be additionally or alternatively configured to suppress undesired noise in the vehicle cabin 4, particularly acoustic feedback, generated by receiving the audio signal 3 which is outputtable or output in the vehicle cabin 4 via the audio outputting device 6. As such, undesired noise in the vehicle cabin 4, particularly acoustic feedback, generated by receiving the audio signal 3 which is outputtable or output in the vehicle cabin 4 via the audio outputting device 6 can be suppressed. The suppression of the undesired noise generated by receiving the audio signal 3 which is outputtable or output in the vehicle cabin 4 via the audio outputting device 6 can be performed with dynamic or static suppression levels ranging from 100% (complete suppression) to 0% (no suppression). Suppressing the signals of the undesired noise generated by receiving the audio signal 3 which is outputtable or output in the vehicle cabin 4 may require separating the human voice signals from the undesired noise signals generated by receiving the audio signal 3 which is outputtable or output in the vehicle cabin 4 or vice versa. In this regard, the above annotations regarding the determination and/or extraction of specific audio signal components from an audio signal 3 apply in analogous manner.

The processing device 11 or a hardware- and/or software-embodied modifying device 16 assignable or assigned to the processing device 11 may further be configured to modify at least one acoustically perceivable parameter, particularly the pitch and/or the reverberation, of an one audio signal component of the audio signal 3 which is outputtable or output in the vehicle cabin 4, particularly an audio signal component containing a human voice, particularly a singer's voice, and/or configured to modify at least one acoustically perceivable parameter, particularly the pitch and/or the reverberation, of the or a received human voice signal 9 of a person P in the vehicle cabin 4. The processing device 11 or the modifying device 16 may thus, (also) deemed or denoted as a sound enhancer. Modifying acoustically perceivable parameters, such as the pitch and/or the reverberation, of a respective audio signal component and/or a respective received human voice signal 9 allows for concertedly adjusting the acoustically perceivable parameters of a respective combined audio signal and thus, the acoustic playback situation in the vehicle cabin 4 which may be useful for implementing special operational modes such as a Karaoke-mode, for instance. As an example, the received human voice signal 9 of a singing person P may be acoustically adapted to the musical piece the person P sings along by varying pitch and/or adding reverberation or vice versa.

Modifying of at least one acoustically perceivable parameter, particularly the pitch and/or the reverberation, of at least one audio signal component of the audio signal 3 which is outputtable or output in the vehicle cabin 4 may also require determining and/or extracting the respective audio signal component which is to be modified. In this regard, the above annotations regarding the determination and/or extraction of specific audio signal components from an audio signal 3 apply in analogous manner. The same applies to modifying of at least one acoustically perceivable parameter, particularly the pitch and/or the reverberation, of a received human voice signal 9.

The at least one audio receiving device 8 may be built as or may comprise at least one mobile, particularly hand-held, audio receiving element 10. A respective mobile audio receiving element may be embodied as a mobile, particularly hand-held, microphone. A mobile microphone can be embodied as a wired microphone or a wireless microphone.

At least one mobile audio receiving element 10 may be assignable or assigned to at least one person seat in the vehicle cabin 4. Hence, the apparatus 2 may distinguish received human person voices based on the assignment of the respective audio receiving elements 10 to the respective person seats in the vehicle cabin 4.

It is also conceivable case that the audio receiving device 8 comprises a plurality of mobile, particularly hand-held, audio receiving elements 10, whereby the receiving level of the respective mobile audio receiving elements 10 is individually adjustable. As such, signals representing at least one main voice and signals representing at least one subsidiary voice can be implemented.

It is also conceivable that microphones provided with mobile terminals (not shown), e.g. smartphones, smartwatches, tablets, notebooks, etc., of a person P could be used a mobile audio receiving element 10. In this case, a respective mobile terminal needs to be connected with the apparatus 2 which can be achieved by a wired or wireless connection. As an example, Bluetooth- or WIFI-connections could be established in the vehicle cabin 4.

Single, a plurality, or all devices, e.g. suppressing devices 12-15 and/or the modifying device 16, assignable or assigned to the processing device 11 can be combined in one or more superordinate devices. The devices, e.g. suppressing devices 12-15 and/or the modifying device 16, assignable or assigned to the processing device 11 may also be embodied as functional blocks of the processing device 11.

The suppressing devices 12-15 may be embodied as or comprise one or more suitable filter devices.

The apparatus 2 allows for implementing a method for outputting and/or reproducing an audio signal in a vehicle cabin 4. The method comprises the steps of:

- outputting, particularly via at least one audio outputting device 6, an audio signal 3 comprising at least one audio signal component containing a human voice, particularly a singer's voice, in a vehicle cabin 4;

receiving, particularly via at least one audio receiving device 8, a human voice signal 9 of at least one person P located in the vehicle cabin 4 whilst outputting the audio signal 3 in the vehicle cabin 4;

combining, via at least one processing device 11, the audio signal 3 and the received human voice signal 9 so as to generate a combined audio signal containing the audio signal 3 and the received human voice signal 9; and outputting and/or reproducing, via the at least one audio outputting device 6, the combined audio signal in the vehicle cabin 4.

The invention claimed is:

1. An apparatus for outputting an audio signal in a vehicle cabin, the apparatus comprising:

at least one audio outputting device configured to output an audio signal comprising at least one audio signal component containing a human voice in a vehicle cabin-;

at least one audio receiving device configured to receive a human voice signal of at least one person located in the vehicle cabin whilst the at least one audio outputting device outputs the audio signal in the vehicle cabin;

at least one processing device configured to combine the audio signal component containing a human voice and the received human voice signal so as to generate a combined audio signal containing both the audio signal component containing the human voice and the received human voice signal, the combined audio signal is outputtable or output in the vehicle cabin via the at least one audio outputting device.

2. The apparatus of claim 1, wherein the at least one audio outputting device is configured to output a respective combined audio signal in the vehicle cabin.

3. The apparatus of claim 1, wherein the processing device or a suppressing device assignable or assigned to the processing device is configured to suppress an audio signal component containing a human voice in an audio signal outputtable or output in the vehicle cabin.

4. The apparatus of claim 3, wherein the processing device or the suppressing device assignable or assigned to the processing device is configured to extract an audio signal component containing a human voice in an audio signal outputtable or output in the vehicle cabin and to separate an extracted audio signal component containing a human voice of the respective audio signal from other audio signal components of the respective audio signal.

5. The apparatus of claim 1, wherein the audio receiving device is configured to receive a human voice signal of at least one first person located in the vehicle cabin and a human voice signal of at least one further person located in the vehicle cabin, whereby the processing device is configured to modify the received human voice signal of the at least one first person located in the vehicle cabin with at least one first acoustic modification parameter and to modify the received human voice signal of the at least one further person located in the vehicle cabin with at least one further acoustic modification parameter.

6. The apparatus of claim 1, wherein the audio receiving device is configured to receive a human voice signal of at least one first person located in the vehicle cabin and a human voice signal of at least one further person located in the vehicle cabin-, whereby the processing device or a suppressing device assignable or assigned to the processing device is configured to suppress the human voice signal of the at least one further person located in the vehicle cabin and to generate a resulting received human voice signal which contains the human voice signal of the at least one first person and a suppressed human voice signal of the at least one further person.

7. The apparatus of claim 1, wherein the audio receiving device is configured to receive a human voice signal of at least one person located in the vehicle cabin and noise from an external noise source acoustically perceivable in the vehicle cabin, whereby the processing device or a suppressing device assignable or assigned to the processing device is configured to suppress the noise acoustically perceivable in the vehicle cabin and to generate a resulting received human voice signal which contains the human voice signal of the at least one person and suppressed noise acoustically perceivable in the vehicle cabin.

8. The apparatus of claim 1, wherein the processing device or a suppressing device assignable or assigned to the processing device is configured to suppress undesired noise in the vehicle cabin generated by receiving the audio signal which is outputtable or output in the vehicle cabin via the at least one audio outputting device.

9. The apparatus of claim 1, wherein the processing device or a modifying device assignable or assigned to the processing device is configured to modify at least one acoustically perceivable parameter, particularly the pitch and/or the reverberation, of at least one audio signal component of the audio signal which is outputtable or output in the vehicle cabin, an audio signal component containing a human voice, and/or configured to modify at least one acoustically perceivable parameter of the received human voice signal of at least one person in the vehicle cabin.

10. The apparatus of claim 1, wherein the at least one audio receiving device is built as or comprises at least one mobile audio receiving element.

11. The apparatus of claim 10, wherein the at least one mobile audio receiving element is assignable or assigned to at least one person seat in the vehicle cabin.

12. The apparatus of claim 1, wherein the audio receiving device comprises a plurality of mobile audio receiving elements, whereby the receiving level of the respective mobile audio receiving elements is individually adjustable.

13. The apparatus of claim 1, wherein the human voice is a singer's voice.

14. The apparatus of claim 10, wherein the at least one acoustically perceivable parameter is the pitch and/or the reverberation.

15. A processing device for an apparatus of claim 1, the processing device being configured to combine an audio signal and a received human voice signal so as to generate a combined audio signal containing the audio signal and the received human voice signal which is outputtable in the vehicle cabin via at least one audio outputting device.

16. A vehicle, comprising a vehicle cabin and an apparatus of claim 1.

17. A method for outputting an audio signal in a vehicle cabin, the method comprising the steps of:

outputting, via at least one audio outputting device, an audio signal comprising at least one audio signal component containing a human voice in a vehicle cabin;

receiving, via at least one audio receiving device, a human voice signal of at least one person located in the vehicle cabin whilst outputting the audio signal in the vehicle cabin; and combining, via at least one processing device, the audio signal component containing a human voice and the received human voice signal so as to generate a combined audio signal containing both the audio signal component containing the human voice and the received human voice signal; and outputting, via the at least one audio outputting device, the combined audio signal in the vehicle cabin.

18. The method of claim 17, wherein the human voice is a singer's voice.

* * * * *